UNITED STATES PATENT OFFICE.

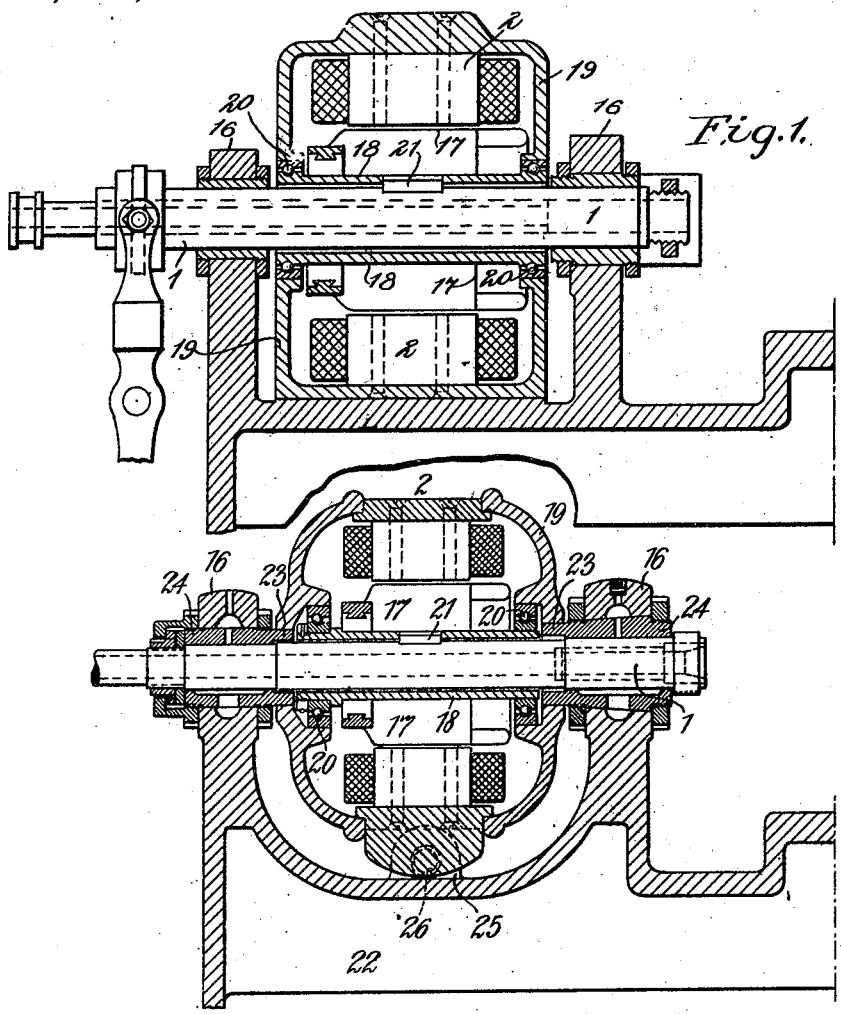

HERBERT KIENZLE, OF SCHWENNINGEN-ON-THE-NECKAR, GERMANY.

LATHE AND OTHER MACHINE.

1,185,681.　　　　　Specification of Letters Patent.　　Patented June 6, 1916.

Application filed July 15, 1913. Serial No. 779,089.

*To all whom it may concern:*

Be it known that I, HERBERT KIENZLE, a citizen of the German Empire, and resident of Schwenningen-on-the-Neckar, Germany, have invented certain new and useful Improvements in Lathes and other Machines, of which the following is a specification.

My invention relates to machines, such as for instance lathes, which comprise a spindle driven by a suitable rotating member or rotor, and the object of my invention is to secure an improved arrangement of the spindle of the lathe or other machine and of the mechanism for driving said spindle. This rotating member or rotor is generally constituted by the armature of an electric motor.

My invention embodies a special arrangement of the spindle bearing and particularly an improved way of journaling the rotor (armature) of the motor and of supporting its housing. In spindle arrangements as employed hitherto, the prevailing practice was to secure the rotor of the motor directly on the lathe spindle, so that this spindle had to support permanently the considerable weight of the rotor. Owing to this defect, it was necessary with the spindle construction employed hitherto, not only to make the spindle and its bearings much heavier than would be required for the mere purpose of resisting the reaction of the cutting operation, but to renew the bearings frequently in view of the relatively rapid wear which naturally impairs the quality of the work. These drawbacks are avoided according to my invention by supporting the rotor of the motor in a sleeve carried and journaled in the housing of the motor, and connected with the lathe spindle so as to rotate in unison therewith. With this arrangement, the weight of the rotor no longer rests on the spindle and on its bearings; thus on one hand the dimensions of the spindle and of its bearings need to be figured only in accordance with reaction or pressure due to the cutting operation, and on the other hand when using an electric motor the air gap between armature and field poles can be made very small in view of the fact that there is no appreciable wear of the spindle bearings, and therefore no necessity for their vertical adjustment.

According to one form of my invention the housing of the motor is mounted, not directly on the bed or frame of the lathe, but in bearings co-axial with the lathe spindle, for instance on the brasses of the spindle bearings.

In the accompanying drawings I have illustrated as much of an automatic lathe as is necessary to explain my invention.

Figure 1 is a longitudinal section through the spindle head and the electromotor; and Fig. 2 is a longitudinal section through the spindle head, showing another way of mounting or supporting the electromotor.

The electromotor 2 serving to drive the lathe spindle 1 is disposed between the spindle bearings 16. The armature 17 of the motor is secured to a sleeve 18 revolving upon bearing balls 20 running in a race provided in the housing 19 of the motor. A key 21 connects the sleeve 18 with the lathe spindle 1, compelling the latter to rotate in unison with the sleeve 18 and with the armature 17. In the form of construction illustrated by Fig. 1, the motor housing 19 rests on the frame or bed 22 of the lathe. According to the construction shown in Fig. 2, the housing 19 of the motor is not mounted on the bed 22 of the lathe, but on inward extensions 23 of the brasses 24 in which the spindle 1 is journaled. The bed 22 is made with lugs 25 through which extend set screws 26 for holding the housing against turning.

The particular spindle arrangement shown in Fig. 2 presents the advantage of the motor's being placed in position without requiring any accurate fitting, since by mounting the housing 19 on the brasses or sleeves 24 of the spindle bearings and by journaling the sleeve 18 which carries the armature of the motor, in the housing 19, the motor in its entirety, without any adjustment, will lie in co-axial relation to the lathe spindle, irrespective of the height at which the spindle bearings are above the lathe bed.

The spindle and motor arrangement described above may of course be applied in connection with machine tools of other types, as grinding or polishing machines, circular saws, etc., without departing from the nature of my invention, although the latter is designed particularly for use in connection with automatic lathes.

Various modifications may be made within the scope of my invention as defined in the appended claims.

I claim as my invention:

1. A lathe or other machine, provided with a spindle, bearings therefor, brasses for said bearings, a driving rotor connected with the spindle to rotate therewith, and a stationary housing containing said rotor and supported on said brasses.

2. A lathe or other machine, provided with a spindle, bearings therefor, brasses for said bearings, and a motor operatively connected with the spindle and provided with a stationary housing supported on said brasses.

3. A lathe or other machine, provided with a spindle, bearings therefor, stationary tubular members extending laterally from the said bearings and having outer surfaces co-axial with the spindle, and a motor operatively connected with the spindle and provided with a stationary housing engaged and centered by the outer surfaces of said tubular members.

4. A lathe or other machine, provided with a spindle, bearings therefor, stationary members extending laterally from said bearings, a motor operatively connected with said spindle and provided with a stationary housing engaged and centered by said stationary members, and means for holding said housing against circumferential movement.

5. A lathe or other machine, provided with a spindle, bearings therefor, tubular stationary members extending laterally from said bearings and having outer surfaces co-axial with the spindle, a motor operatively connected with said spindle and comprising a housing engaged and centered by the outer surfaces of said tubular members, and bearings interposed between said spindle and the motor housing.

6. A lathe or other machine, provided with a supported spindle, stationary members having supporting surfaces co-axial with said spindle, and a motor operatively connected with said spindle and comprising a housing engaged and centered by said supporting surfaces.

7. A lathe or other machine, provided with a supported spindle, stationary members having supporting surfaces co-axial with said spindle, a motor operatively connected with said spindle and comprising a housing engaged and centered by said supporting surfaces, and means for holding said housing against circumferential movement.

8. A lathe or other machine, provided with a supported spindle, stationary members having supporting surfaces co-axial with said spindle, and a motor comprising a housing engaged and centered by said supporting surfaces, and provided with interior supporting surfaces co-axial with those portions of the housing which are in engagement with the supporting surfaces of said stationary members, and a driving rotor supported by said interior supporting surfaces of the housing and connected with said spindle to rotate therewith.

In testimony whereof, I have signed this specification in the presence of two subscribing witnesses.

HERBERT KIENZLE.

Witnesses:
 Ch. Zanch,
 A. Fühling.